(12) United States Patent
Ohta

(10) Patent No.: US 9,044,985 B2
(45) Date of Patent: Jun. 2, 2015

(54) PRINTING DEVICE

(75) Inventor: Keiji Ohta, Nagano (JP)

(73) Assignee: NIDEC SANKYO CORPORATION (JP)

( * ) Notice: Subject to any disclaimer, the term of this patent is extended or adjusted under 35 U.S.C. 154(b) by 0 days.

(21) Appl. No.: 14/232,565

(22) PCT Filed: Jul. 11, 2012

(86) PCT No.: PCT/JP2012/067694
§ 371 (c)(1),
(2), (4) Date: Jan. 13, 2014

(87) PCT Pub. No.: WO2013/008846
PCT Pub. Date: Jan. 17, 2013

(65) Prior Publication Data
US 2014/0146122 A1    May 29, 2014

(30) Foreign Application Priority Data
Jul. 13, 2011    (JP) .................................. 2011-155275

(51) Int. Cl.
| | | |
|---|---|---|
| *B41J 35/04* | (2006.01) | |
| *B41J 35/38* | (2006.01) | |
| *B41J 17/38* | (2006.01) | |
| *G06K 15/02* | (2006.01) | |
| *G06K 15/16* | (2006.01) | |
| *G06K 15/00* | (2006.01) | |

(52) U.S. Cl.
CPC ........ *B41J 35/04* (2013.01); *B41J 35/38* (2013.01); *B41J 17/38* (2013.01); *G06K 15/028* (2013.01); *G06K 15/16* (2013.01); *G06K 15/4065* (2013.01)

(58) Field of Classification Search
CPC ............. B41J 15/04; B41J 17/38; B41J 2/325
USPC .................................. 347/171, 179, 198, 222
See application file for complete search history.

(56) References Cited

FOREIGN PATENT DOCUMENTS

| | | | | | |
|---|---|---|---|---|---|
| JP | 5-229147 | A | | 9/1993 | |
| JP | 05229147 | A | * | 9/1993 | ............... B41J 2/325 |
| JP | 6-15904 | A | | 1/1994 | |
| JP | 8-133506 | A | | 5/1996 | |
| JP | 08133506 | A | * | 5/1996 | ............... B65H 3/06 |
| JP | 2002-166613 | A | | 6/2002 | |
| JP | 2002166613 | A | * | 6/2002 | ............... B41J 17/02 |
| JP | 2005-74902 | A | | 3/2005 | |

(Continued)

OTHER PUBLICATIONS

International Search Report for International Application No. PCT/JP2012/067694, mailed Aug. 14, 2012, with English translation.

*Primary Examiner* — Sarah Al Hashimi
(74) *Attorney, Agent, or Firm* — Cantor Colburn LLP

(57) ABSTRACT

A printing device may include a medium conveying passage along which the printing medium is conveyed; a printing thermal head structured to heat an ink ribbon; a ribbon supplying part; a ribbon winding part; an erasing thermal head disposed between the printing thermal head and the ribbon winding part in a feed direction of the ink ribbon, the erasing thermal head heating the ink ribbon after ink is transferred by the printing thermal head; a transferred roller oppositely disposed to the erasing thermal head and is transferred with ink of the ink ribbon heated by the erasing thermal head; and a roller holding part which holds the transferred roller. The transferred roller may be capable of being attached to and detached from the roller holding part.

10 Claims, 11 Drawing Sheets

(56) References Cited

FOREIGN PATENT DOCUMENTS

| JP | 2010-194907 A | 9/2010 |
| JP | 2010194907 A * | 9/2010 |
| JP | 2011-140119 A | 7/2011 |

* cited by examiner

Fig. 1
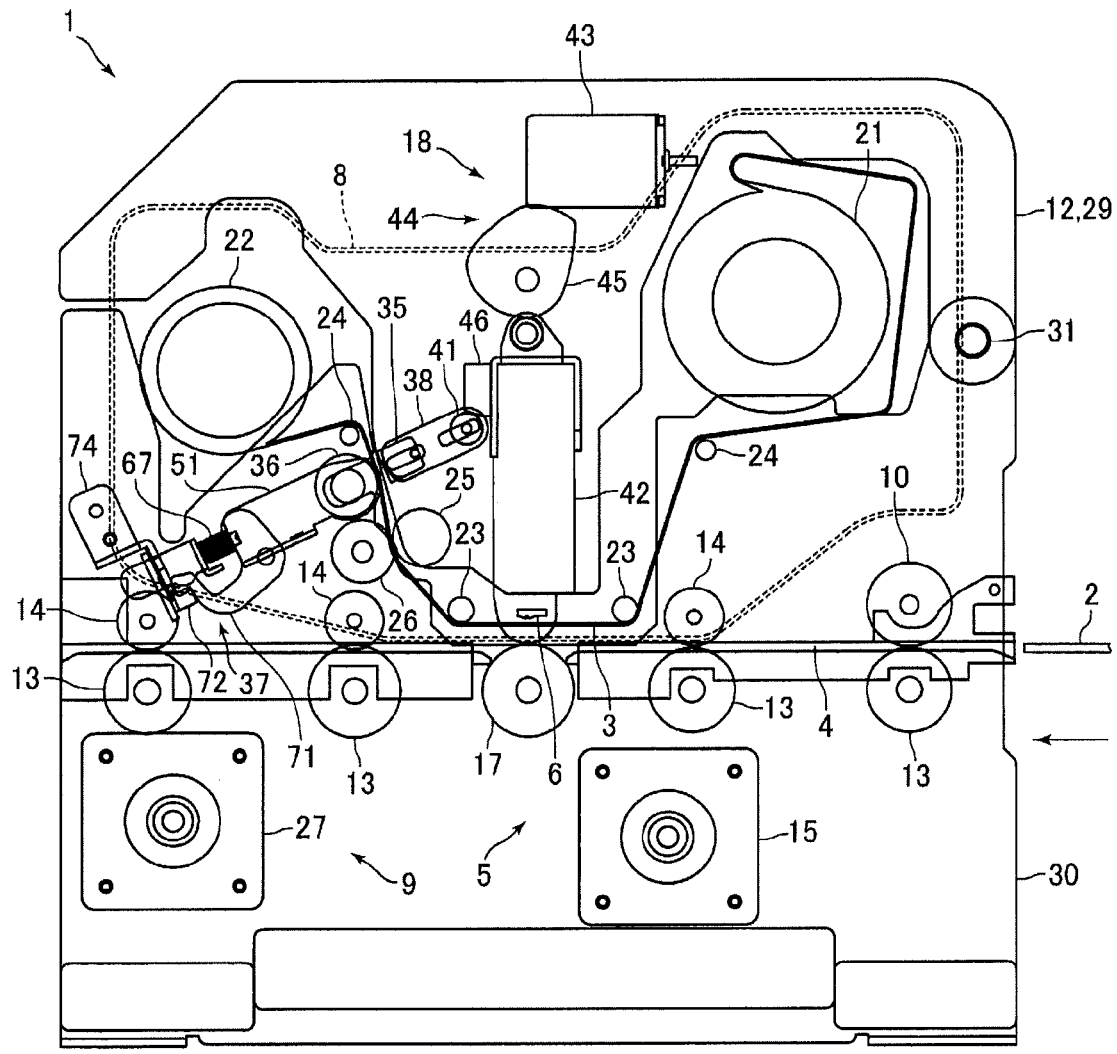
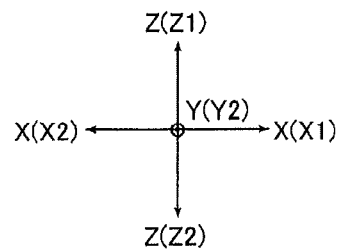

Fig. 4
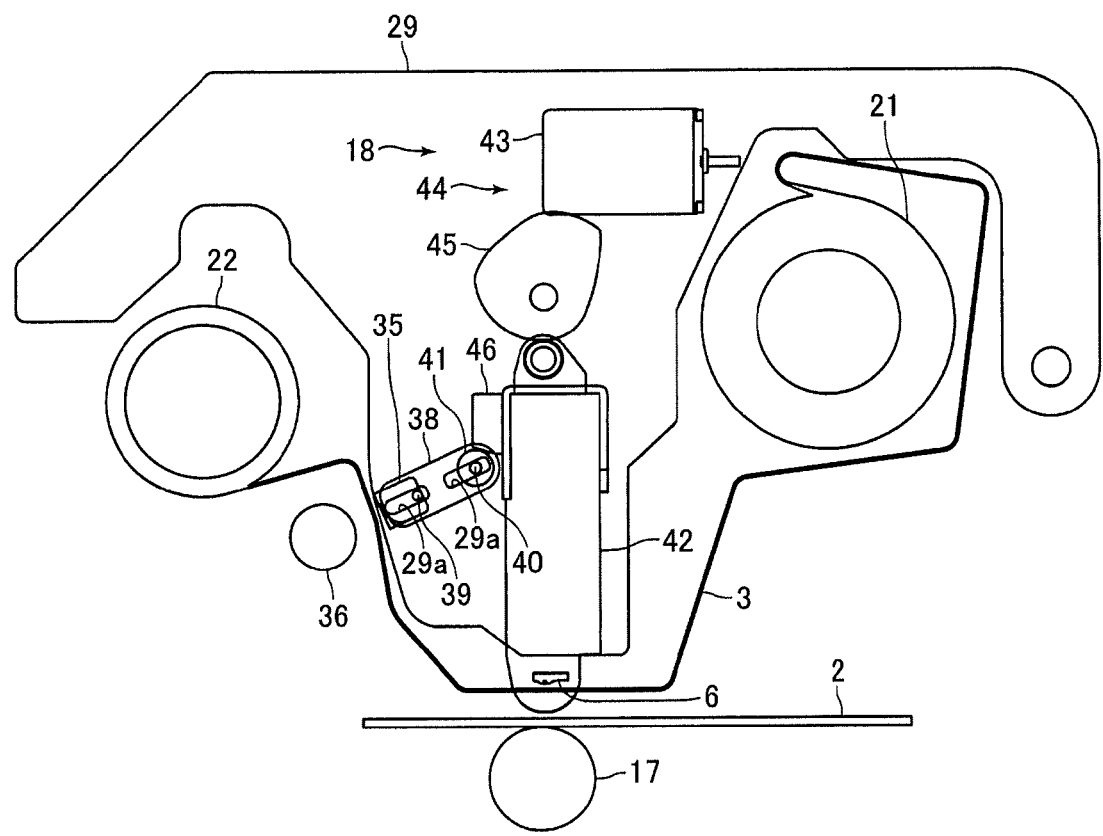
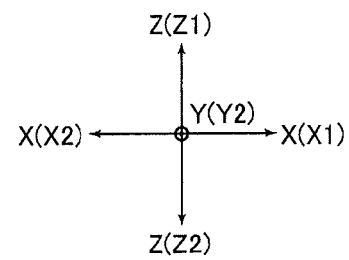

PRINTING DEVICE

CROSS REFERENCE TO RELATED APPLICATIONS

This is the U.S. national stage of application No. PCT/JP2012/067694, filed on 11 Jul. 2012. Priority under 35 U.S.C. §119(a) and 35 U.S.C. §365(b) is claimed from Japanese Application No. 2011-155275, filed 13 Jul. 2011, the disclosure of which is also incorporated herein by reference.

FIELD OF THE INVENTION

The present invention relates to a printing device in which an ink ribbon is heated by a printing thermal head and ink applied to the ink ribbon is transferred and printed on a printing medium.

BACKGROUND

Conventionally, a thermal transfer type printing device has been widely utilized in which an ink ribbon is heated by a thermal head and ink applied to the ink ribbon is transferred and printed on a printing medium. In the printing device, ink having the same shape as an image printed on the printing medium is printed from the ink ribbon and thus, after printing is performed, printed traces of ink having the same shape as the printed image are left on the ink ribbon. Therefore, when the printed traces are observed or, when the portion of the ink ribbon which is left without being printed is thermally transferred again, the image printed on the printing medium can be recognized easily.

In recent years, a card issuing system provided with a thermal transfer type printing device in which, when a card is conveyed through a card conveying passage, character information or the like is printed on a surface of a card by a thermal head, a hot stamp or the like has been increasingly installed in a store of a financial institution such as a bank. In the printing device in the card issuing system, there is a risk that an administrator for the device can easily obtain the image printed on the card from the printed traces of ink which are left in the used ink ribbon, or that a third person can easily obtain the image printed on the card from the printed traces of ink which are left in the discarded and used ink ribbon. That is an important issue to be solved in these days when protection of personal information is regarded as very important.

Conventionally, a thermal transfer type printing device has been proposed which is capable of solving the above-mentioned problem (see, for example, Patent Literature 1). The printing device described in Patent Literature 1 includes an erasing thermal head for heating an ink ribbon after ink has been transferred to a member to be transferred by a thermal head, and a transferred roller to which ink of the ink ribbon heated by the erasing thermal head is transferred. Therefore, in the printing device, printed traces of ink having a shape different from the image printed on the member to be transferred are left in the used ink ribbon. Accordingly, in the printing device, the personal information printed on the member to be transferred can be protected.

PATENT LITERATURE

[PTL 1] Japanese Patent Laid-Open No. 2011-140119

In the printing device described in Patent Literature 1, ink of the ink ribbon heated by the erasing thermal head is transferred to the transferred roller and thus the surface of the transferred roller is gradually stained with the ink. When the surface of the transferred roller is stained with the ink, the ink of the ink ribbon heated by the erasing thermal head is hard to be transferred to the transferred roller. In a case that the ink of the ink ribbon is hard to be transferred to the transferred roller, the printed traces of the ink having the same shape as the image printed on the member to be transferred may be left in the used ink ribbon and, as a result, the image printed on the member to be transferred may be acquired.

SUMMARY

In view of the problem described above, at least an embodiment of the present invention provides a printing device including a transferred roller to which ink of an ink ribbon heated by an erasing thermal head is transferred, the printing device being capable of preventing printed traces of ink having the same shape as a printing image printed on a printing medium from being left in the used ink ribbon.

In order to attain the above, at least an embodiment of the present invention provides a printing device including a medium conveying passage along which a printing medium is conveyed, a printing thermal head structured to heat an ink ribbon to transfer and print ink applied to the ink ribbon on a printing medium which is conveyed along the medium conveying passage, a ribbon supplying part for supplying the ink ribbon to the printing thermal head, a ribbon winding part for winding up the ink ribbon which is supplied to the printing thermal head, an erasing thermal head which is disposed between the printing thermal head and the ribbon winding part in a feed direction of the ink ribbon which is supplied from the ribbon supplying part to the ribbon winding part, the erasing thermal head heating the ink ribbon after ink is transferred by the printing thermal head, a transferred roller which is oppositely disposed to the erasing thermal head and is transferred with ink of the ink ribbon heated by the erasing thermal head, and a roller holding part which holds the transferred roller. The transferred roller is capable of being attached to and detached from the roller holding part.

In the printing device in accordance with at least an embodiment of the present invention, the transferred roller is capable of being attached to and detached from the roller holding part which holds the transferred roller and thus the transferred roller is capable of being exchanged. Therefore, in at least an embodiment of the present invention, when the transferred roller is exchanged before the surface of the transferred roller is stained with ink in such a state that ink of the ink ribbon heated by the erasing thermal head is not transferred, a state is avoided that ink of the ink ribbon heated by the erasing thermal head is not transferred to the transferred roller. As a result, according to at least an embodiment of the present invention, printed traces of the ink having the same shape as a printing image printed on a printing medium are prevented from being left on the used ink ribbon. Further, in at least an embodiment of the present invention, when the transferred roller is exchanged, a state that ink of the ink ribbon heated by the erasing thermal head is not transferred to the transferred roller is avoided and thus maintenance of the printing device is easily performed.

In at least an embodiment of the present invention, it is preferable that the roller holding part includes a first engaging part which is engaged with one end in an axial direction of the transferred roller and is rotated together with the transferred roller, a second engaging part which is engaged with the other end in the axial direction of the transferred roller and is rotated together with the transferred roller and is movable in the axial direction of the transferred roller, and an engaging part urging member which urges the second engaging part toward the transferred roller, and that the transferred roller is held by the roller holding part through an urging force of the engaging part urging member and, when the second engaging part is moved against the urging force of the engaging part urging member, the transferred roller is capable of being detached from the roller holding part. According to this structure, when the second engaging part is moved in the axial direction of the transferred roller, the transferred roller can be exchanged. Therefore, the transferred roller can be exchanged relatively easily.

In at least an embodiment of the present invention, it is preferable that the printing device includes a detection mechanism for detecting that an outer diameter of the transferred roller whose outer diameter becomes larger by being transferred with the ink of the ink ribbon has become a predetermined size or more. According to this structure, based on a detected result of the detection mechanism, the transferred roller can be surely exchanged before the surface of the transferred roller is stained with ink in such a state that ink of the ink ribbon heated by the erasing thermal head is not transferred. Therefore, a state that ink of the ink ribbon heated by the erasing thermal head is not transferred to the transferred roller is surely avoided.

In at least an embodiment of the present invention, the printing device includes, for example, a second roller holding part which movably holds the roller holding part in a direction that the transferred roller is approached to the erasing thermal head and in a direction that the transferred roller is separated from the erasing thermal head, and a holding part urging member which urges the roller holding part in the direction that the transferred roller is approached to the erasing thermal head. The detection mechanism includes a lever member which is turned with movement of the roller holding part and a sensor which detects movement of the lever member.

In this case, it is preferable that the second roller holding part includes a fixed shaft which turnably holds the lever member, and the lever member includes a holding part engaging part which is engaged with the roller holding part and a detected part which is detected by the sensor, and a distance from the fixed shaft which is a turning center of the lever member to the detected part is longer than a distance from the fixed shaft to the holding part engaging part. Although variation amount of the outer diameter of the transferred roller to which the ink of the ink ribbon is transferred is a little, according to this structure, the variation of the outer diameter of the transferred roller can be accurately detected by the sensor.

In at least an embodiment of the present invention, it is preferable that at least an outer peripheral face of the transferred roller is formed of the same material as the printing medium. Generally, ink which is easily transferred to a printing medium is used as the ink for the ink ribbon and thus, according to this structure, the ink of the ink ribbon heated by the erasing thermal head is easily transferred to the transferred roller.

In at least an embodiment of the present invention, it is preferable that the transferred roller includes a core member made of rubber and an outer cover member in a tube shape which is formed of the same material as the printing medium and covers an outer peripheral face of the core member. According to this structure, the outer cover member can be pressed on the ink ribbon in a further wide region by utilizing elasticity of the core member made of rubber. Therefore, ink in a further wide region of the ink ribbon heated by the erasing thermal head can be transferred to the transferred roller and, as a result, printed traces of ink having the same shape as a printing image printed on a printing medium can be effectively prevented from being left in the used ink ribbon. Further, according to this structure, when the outer cover member to which ink is transferred is exchanged, the transferred roller can be reused. Therefore, a running cost of the printing device can be reduced.

In at least an embodiment of the present invention, it is preferable that the printing device includes a facing member which is oppositely disposed to the printing thermal head and a head moving mechanism which moves the printing thermal head in a direction that the printing thermal head is approached to the facing member and in a direction that the printing thermal head is separated from the facing member, and that the head moving mechanism moves the erasing thermal head interlocking with movement of the printing thermal head in a direction that the erasing thermal head is approached to the transferred roller and in a direction that the erasing thermal head is separated from the transferred roller. According to this structure, the ink ribbon after ink is transferred by the printing thermal head is surely heated by the erasing thermal head and the ink of the ink ribbon after the ink is transferred by the printing thermal head is surely transferred to the transferred roller.

In at least an embodiment of the present invention, it is preferable that the head moving mechanism moves the printing thermal head and the erasing thermal head to the following three positions; a first position where the printing thermal head is separated from the facing member and the erasing thermal head is separated from the transferred roller, a second position where the printing thermal head is approached to the facing member and the erasing thermal head is approached to the transferred roller, and a third position where the printing thermal head is separated from the facing member and the erasing thermal head is approached to the transferred roller. According to this structure, even when a printing medium is not printed by the printing thermal head, ink of the ink ribbon can be transferred to the transferred roller by using the erasing thermal head.

In at least an embodiment of the present invention, it is preferable that the printing device includes a drive motor for rotating a winding core of the ribbon winding part and the transferred roller, and a power transmission mechanism for transmitting power of the drive motor to the winding core and the transferred roller, and that a moving speed of the ink ribbon which is wound up by the winding core is set to be faster than a moving speed of the ink ribbon which is fed by the transferred roller, and the power transmission mechanism includes a torque limiter which limits a winding torque for the ink ribbon by the winding core, and a one-way clutch by which the transferred roller is idled in a direction that the winding core winds up the ink ribbon.

According to this structure, a moving speed of the ink ribbon which is wound up by the winding core is set to be faster than a moving speed of the ink ribbon which is fed by the transferred roller and thus the ink ribbon is prevented from being loosened between the winding core and the transferred roller. Further, the power transmission mechanism includes a one-way clutch by which the transferred roller is idled in a direction that the winding core winds up the ink ribbon and thus, even when a moving speed of the ink ribbon which is wound up by the winding core is faster than a moving speed of the ink ribbon which is fed by the transferred roller, a load to the drive motor can be reduced.

Further, the power transmission mechanism includes a torque limiter which limits a winding torque for the ink ribbon by the winding core and thus, for example, even when the ink ribbon is stuck to the transferred roller to cause the winding torque for the ink ribbon by the winding core to be larger, the ink ribbon can be prevented from being broken between the winding core and the transferred roller. Further, when the torque limiter is acted and a moving speed of the ink ribbon which is wound up by the winding core becomes lower, the power of the drive motor is transmitted to the transferred roller and the transferred roller feeds the ink ribbon toward the winding core and thus, even when the ink ribbon is stuck to the transferred roller, sticking of the ink ribbon to the transferred roller can be eliminated.

As described above, according to at least an embodiment of the present invention, in the printing device including the transferred roller to which ink of an ink ribbon heated by the erasing thermal head is transferred, printed traces of ink having the same shape as a printing image printed on a printing medium is prevented from being left in the used ink ribbon.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIG. 1 is an explanatory side view showing an inside structure of a printing device in accordance with an embodiment of the present invention.

FIG. 4 is an explanatory view showing a structure of a head moving mechanism shown in FIG. 1.

FIG. 5(A) is a view showing a state that a printing thermal head and an erasing thermal head are located at a second position, and FIG. 5(B) is a view showing a state that the printing thermal head and the erasing thermal head are located at a third position.

DESCRIPTION OF EMBODIMENTS

Figure 2:
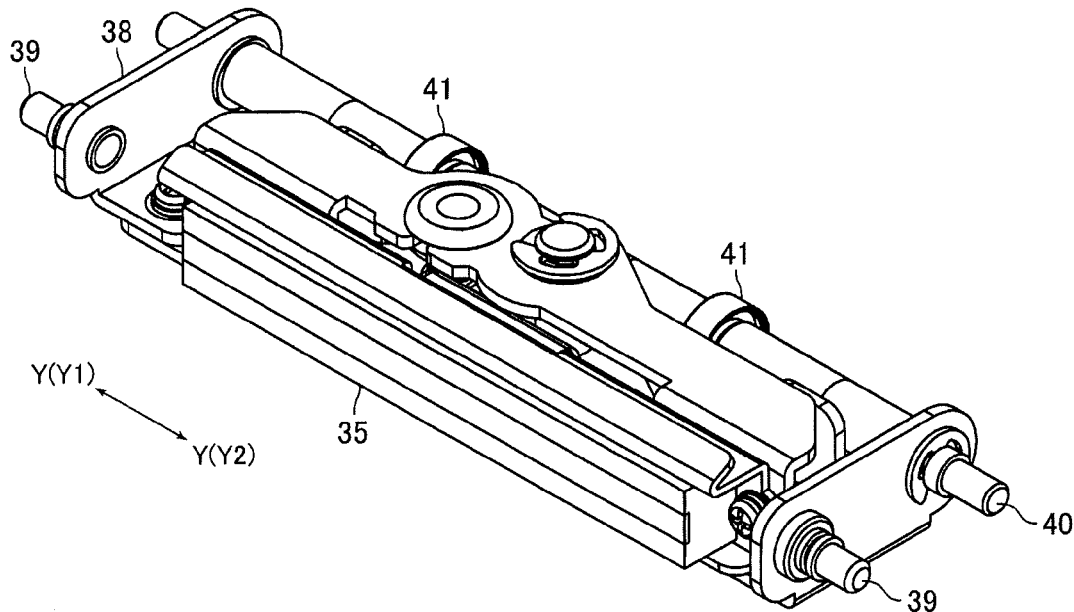
FIG. 2 is a perspective view showing an erasing thermal head and its peripheral portion shown in FIG. 1.

At least an embodiment of the present invention will be described below with reference to the accompanying drawings.
(Schematic Structure of Printing Device)

FIG. 1 is an explanatory side view showing an inside structure of a printing device 1 in accordance with an embodiment of the present invention.

The printing device 1 in this embodiment is a device structured to print a printing image such as a character, a sign and a figure on a card 2 which is a printing medium. Specifically, the printing device 1 is a printing device in a thermal transfer system, in which an ink ribbon 3 formed by applying ink on a band-shaped film is used, and ink of the ink ribbon 3 is transferred and printed on a card 2 by applying heat. The printing device 1 is, for example, mounted and used in a host device such as a card issuing device. Various inks may be used as ink which is applied to the ink ribbon 3 and the color of the ink is not limited. Further, the ink ribbon 3 in this embodiment is capable of only monochromatic printing (for example, black) but the ink ribbon 3 capable of printing in a plurality of colors may be utilized.

A card conveying passage 4 as a medium conveying passage where a card 2 is conveyed is formed on an inside of the printing device 1. The card conveying passage 4 is formed in a straight line shape so as to penetrate through the printing device 1 in a right and left direction in FIG. 1. The printing device 1 includes a card conveying mechanism 5 structured to convey a card 2 along the card conveying passage 4, a printing thermal head 6 (hereinafter, referred to as "thermal head 6") which heats an ink ribbon 3 to transfer and print ink on the card 2, an ink ribbon cartridge 8 (hereinafter, referred to as "cartridge 8") for supplying and winding the ink ribbon 3, a ribbon feeding mechanism 9 which feeds the ink ribbon 3 from a ribbon supplying part 21 to a ribbon winding part 22 described below, and a cleaning roller 10 for removing dust and the like stuck to a surface of the card 2 before printing is performed. The thermal head 6 and the like are accommodated in an inside of a housing 12.

A card 2 in this embodiment is, for example, a card made of polyvinyl chloride whose thickness is about 0.7-0.8 mm and is formed in a substantially rectangular shape. A surface of the card 2 is, for example, formed with a magnetic stripe in which magnetic data are recorded. An IC chip and an antenna for communication may be incorporated in the card 2.

Figure 6:
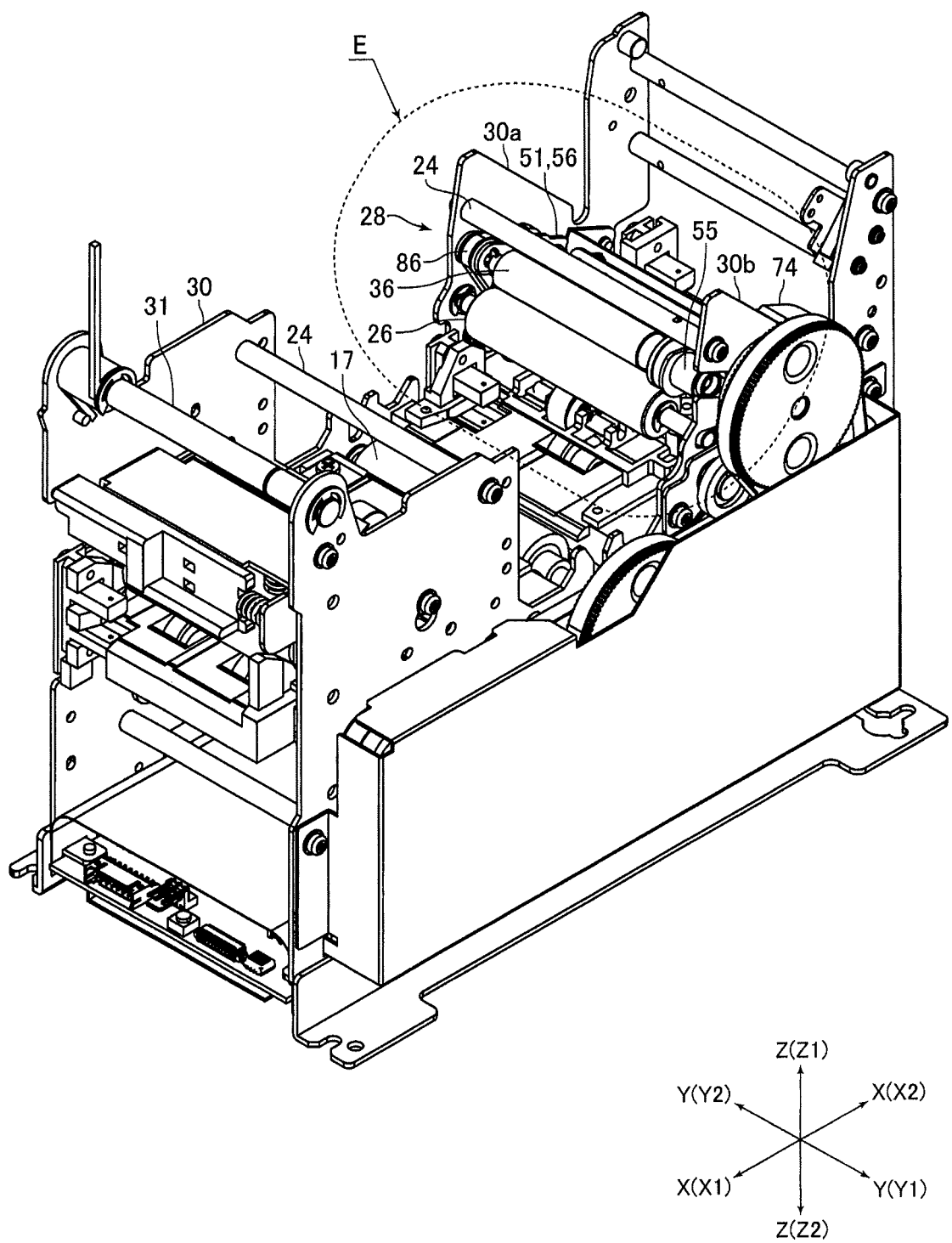
FIG. 6 is a perspective view showing a state that a first housing and a structure attached to the first housing are detached from the printing device shown in FIG. 1.

In the following description, three directions perpendicular to each other are respectively referred to as an "X" direction, a "Y" direction and a "Z" direction. Further, the "X" direction is referred to as a "front and rear direction", the "Y" direction is a "right and left direction" and the "Z" direction is an "upper and lower direction", and an "X1" direction side is referred to as a "front" side, an "X2" direction side is a "rear (back)" side, a "Z1" direction side is an "upper" side and a "Z2" direction side is a "lower" side. Further, as shown in FIG. 6, a "Y1" direction side (back side to the paper face in FIG. 1) is referred to as a "right" side, and a "Y2" direction side (front side to the paper face in FIG. 1) is referred to as a "left" side. In this embodiment, a card 2 is conveyed from the front side to the rear side by the card conveying mechanism 5 so that a longitudinal direction of the card 2 formed in a substantially rectangular shape is substantially coincided with the front and rear direction ("X" direction) and a thickness direction of the card 2 is substantially coincided with the upper and lower direction ("Z" direction).

The card conveying mechanism 5 includes a plurality of card conveying rollers 13 which are abutted with a card 2 to convey the card 2, and pad rollers 14 which are oppositely disposed to some of the card conveying rollers 13. The card conveying rollers 13 are disposed so as to protrude in the card conveying passage 4 from a lower side. A plurality of the card conveying rollers 13 is connected with a card conveyance motor 15 through a power transmission mechanism (not shown) structured of pulleys, a timing belt and the like. The pad roller 14 faces the card conveying roller 13 from an upper side and is urged toward the card conveying roller 13.

The thermal head 6 is disposed at the substantially middle in the front and rear direction of the printing device 1 and on an upper side with respect to the card conveying passage 4. A platen roller 17 is disposed as a facing member on a lower side with respect to the thermal head 6. The platen roller 17 faces the thermal head 6 through a card 2 at the time of printing on the card 2. Further, the platen roller 17 is connected with the card conveyance motor 15 through a power transmission mechanism which connects the card conveying rollers 13 with the card conveyance motor 15 and the platen roller 17 is rotated together with the card conveying roller 13.

The thermal head 6 is connected with a head moving mechanism 18 which moves the thermal head 6 in an approaching direction to the platen roller 17 and in a separated direction from the platen roller 17. A card 2 and the ink ribbon 3 pass through between the thermal head 6 and the platen roller 17 in the upper and lower direction. Further, the thermal head 6 is moved up and down with respect to the card conveying passage 4 (specifically, to the platen roller 20) by power transmitted from the head moving mechanism 18. The thermal head 6 is abutted with an upper face of a card 2 with a predetermined abutting force through the ink ribbon 3 and performs printing on the upper face of the card 2 which is conveyed along the card conveying passage 4. A specific structure of the head moving mechanism 18 will be described below.

The cartridge 8 includes a ribbon supplying part 21 for supplying an ink ribbon 3 toward the thermal head 6 and a ribbon winding part 22 for winding a used ink ribbon 3 which is supplied to the thermal head 6 and printing by the thermal head 6 has been finished. The cartridge 8 is disposed on an upper side with respect to the card conveying passage 4 and is detachably mounted on the housing 12. Further, the ribbon supplying part 21 is disposed on the front side with respect to the thermal head 6 and the ribbon winding part 22 is disposed on the rear side with respect to the thermal head 6. The ribbon winding part 22 is connected with the ribbon feeding mechanism 9. A connected portion of the ribbon winding part 22 with the ribbon feeding mechanism 9 will be described in detail below.

Further, the cartridge 8 includes plural shafts 23 disposed with the right and left direction as its axial direction and a pair of frames which are connected through the plural shafts 23. The ribbon supplying part 21 and the ribbon winding part 22 are supported between the pair of the frames. The ink ribbon 3 is guided from the ribbon supplying part 21 to the thermal head 6 and is guided from the thermal head 6 to the ribbon winding part 22 by the plural shafts 23, and shafts 24 fixed to a second housing 30 with the right and left direction as its axial direction. Specifically, the ink ribbon 3 is guided from the ribbon supplying part 21 toward the thermal head 6 in a roughly obliquely rear and lower direction and is guided from the thermal head 6 toward the ribbon winding part 22 on a roughly obliquely rear and upper side. Further, the ink ribbon 3 is disposed so that an applied face of ink faces a card 2 and a face on the opposite side faces the thermal head 6.

The ribbon feeding mechanism 9 includes a ribbon feed roller 25, which is abutted with an ink ribbon 3 to feed the ink ribbon 3, and a pad roller 26 which is oppositely disposed to the ribbon feed roller 25. Further, the ribbon feeding mechanism 9 includes a ribbon feed motor 27 with which the ribbon feed roller 25 is connected and a power transmission mechanism 28 (see FIG. 12) for transmitting power of the ribbon feed motor 27 to the ribbon feed roller 25 and the like. The ribbon feed roller 25 is disposed on an obliquely rear and upper side with respect to the thermal head 6 and is disposed between the thermal head 6 and the ribbon winding part 22.

The pad roller 26 faces the ribbon feed roller 25 from a roughly rear side and is urged toward the ribbon feed roller 25. A further specific structure of the ribbon feeding mechanism 9 will be described below.

A cleaning roller 10 is disposed on a front end side of the printing device 1. The cleaning roller 10 faces one of the card conveying rollers 13 which is disposed on the most front side from the upper side and is urged toward the card conveying roller 13. The cleaning roller 10 cleans an upper face of a card 2 before printing is performed by the thermal head 6.

The housing 12 is structured of a first housing 29 disposed on an upper side and a second housing 30 disposed on a lower side. A front end side of the first housing 29 is turnably held by a shaft 31 which is disposed with the right and left direction as its axial direction and the first housing 29 is turnable with respect to the second housing 30 in a clockwise direction (clock direction) in FIG. 1 from a state shown in FIG. 1 with the shaft 31 as a turning center. When the first housing 29 is turned in a clockwise direction with respect to the second housing 30, the cartridge 8 can be taken out from the housing 12.

Further, the printing device 1 in this embodiment includes an erasing thermal head 35 (hereinafter, referred to as "thermal head 35") by which the ink ribbon 3 after ink has been transferred by the thermal head 6 is heated, a transferred roller 36 to which the ink of the ink ribbon 3 heated by the thermal head 35 is transferred, and a detection mechanism 37 for detecting whether or not an outer diameter of the transferred roller 36 to which the ink of the ink ribbon 3 is transferred and its outer diameter becomes larger has become a predetermined size or more. Detailed structures of the thermal head 35, the transferred roller 36, the detection mechanism 37 and their peripheral portions will be described below.

(Structure of Peripheral Portion of Erasing Thermal Head and Structure of Head Moving Mechanism)

Figure 3:
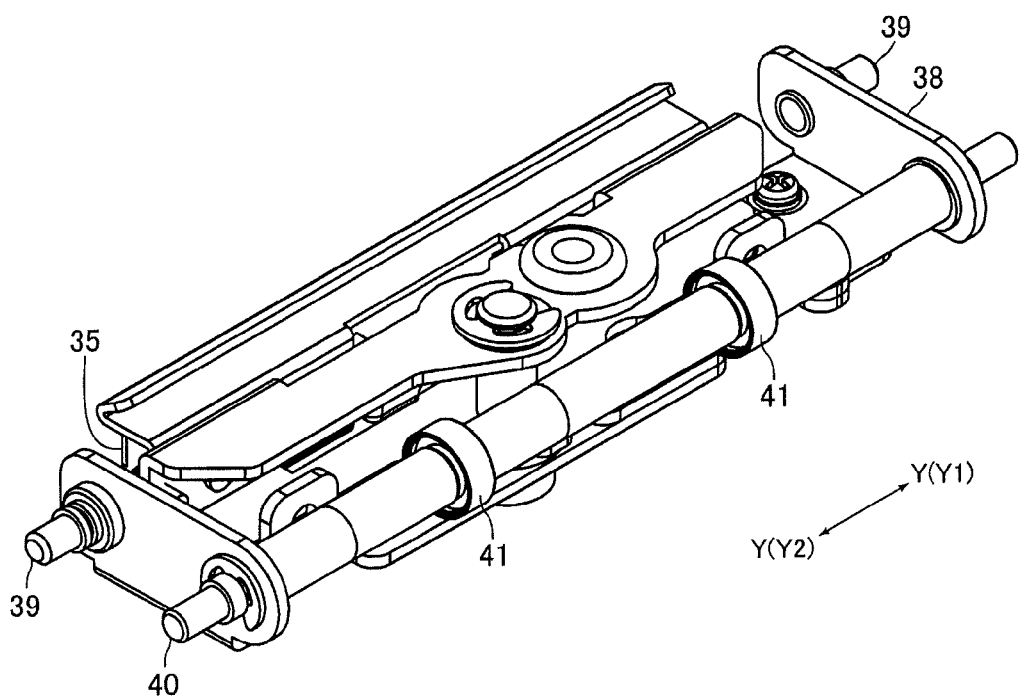
FIG. 3 is a perspective view showing the erasing thermal head and its peripheral portion shown in FIG. 2 which is viewed from another direction.
Figure 5A:
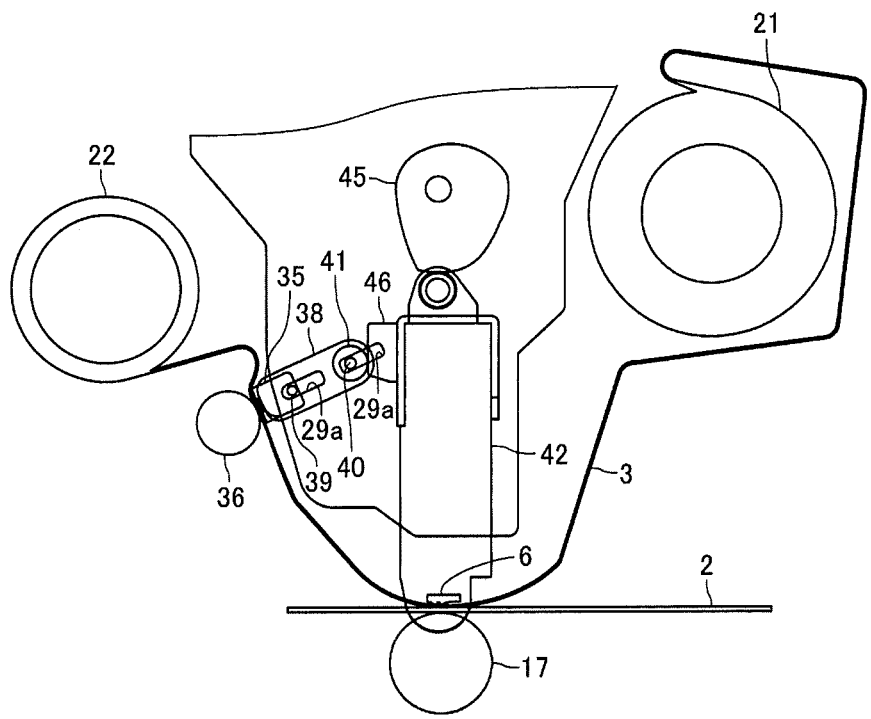
FIGS. 5(A) and 5(B) are views for explaining an operation of the head moving mechanism shown in FIG. 1.
Figure 5B:
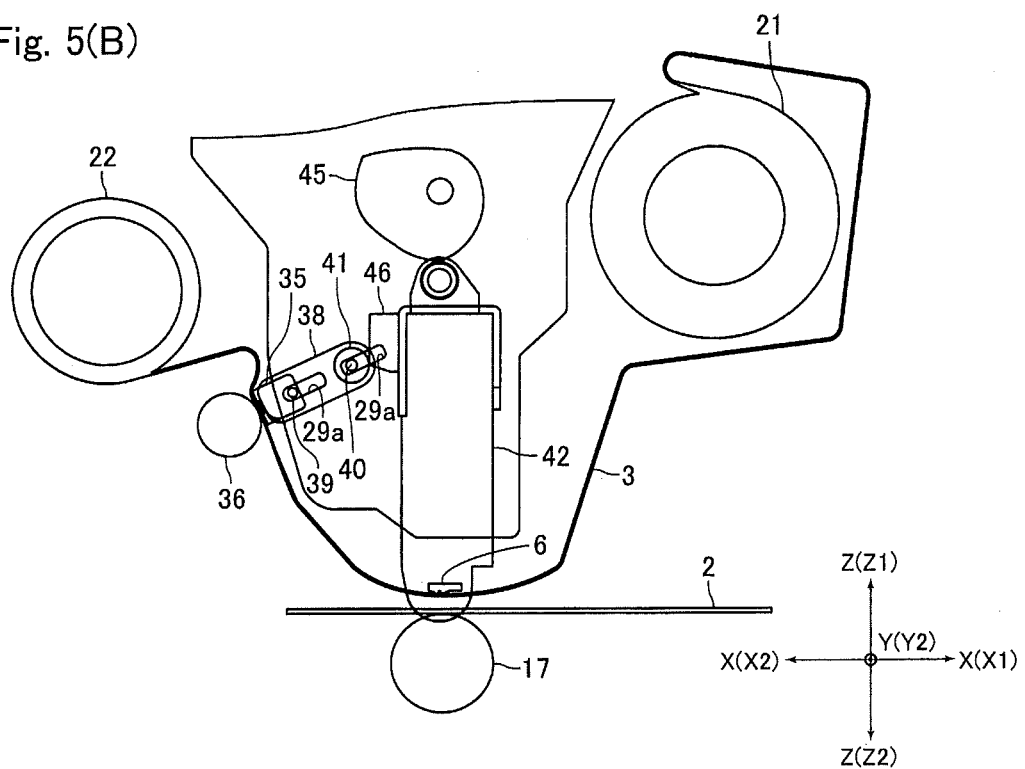

FIG. 2 is a perspective view showing the erasing thermal head 35 and its peripheral portion shown in FIG. 1. FIG. 3 is a perspective view showing the erasing thermal head 35 and its peripheral portion shown in FIG. 2 which is viewed from another direction. FIG. 4 is an explanatory view showing a structure of the head moving mechanism 18 shown in FIG. 1. FIGS. 5(A) and 5(B) are views for explaining an operation of the head moving mechanism 18 shown in FIG. 1. FIG. 5(A) is a view showing a state that the printing thermal head 6 and the erasing thermal head 35 are located at a second position, and FIG. 5(B) is a view showing a state that the printing thermal head 6 and the erasing thermal head 35 are located at a third position.

The thermal head 35 is disposed between the thermal head 6 and the ribbon winding part 22 in a feed direction of the ink ribbon 3 from the ribbon supplying part 21 to the ribbon winding part 22. In other words, the thermal head 35 is disposed on an obliquely rear and upper side with respect to the thermal head 6. The thermal head 35 is attached to a head holder 38. The head holder 38 is held by the first housing 29 so that the thermal head 35 is capable of moving in a direction approaching the transferred roller 36 and in a direction separated from the transferred roller 36. Specifically, the head holder 38 is held by the first housing 29 so as to be movable in an obliquely front and upper direction and in an obliquely rear and lower direction.

The head holder 38 is fixed with guide shafts 39 and 40 for guiding the head holder 38 in its moving direction. The guide shafts 39 and 40 are fixed to the head holder 38 so as to protrude from both ends in the right and left direction of the head holder 38. The guide shafts 39 and 40 are engaged with guide grooves 29a formed in the first housing 29. Two rollers 41 are attached to the guide shaft 40 which is fixed on the front upper end side of the head holder 38. Two rollers 41 are rotatably held by the guide shaft 40. Further, the head holder 38 is urged in a direction so that the thermal head 35 is separated from the transferred roller 36 (in other words, in an obliquely front upper direction) by an urging member not shown.

The head moving mechanism 18 includes a head holder 42 which holds the thermal head 6, a head drive motor 43 for moving the thermal head 6 up and down together with the head holder 42, and a power transmission mechanism 44 for transmitting power of the head drive motor 43 to the head holder 42. The power transmission mechanism 44 includes an eccentric cam 45 which abuts with an upper end side of the head holder 42. The thermal head 6 is fixed to a lower end side of the head holder 42. The head holder 42 is urged by an urging member not shown in a direction so that the thermal head 6 is separated from the platen roller 17 (in other words, an upper direction). A rear face of the head holder 42 is fixed with a cam 46 for moving the thermal head 35. As described above, the head holder 38 is urged in an obliquely front upper direction and a rear face of the cam 46, which is a cam face of the cam 46, is abutted with the roller 41 which is held by the head holder 38.

In this embodiment, when the head drive motor 43 is rotated, the eccentric cam 45 is rotated and thus the head holder 42 is moved up and down and the roller 41 is rotated along the cam face of the cam 46 to move the head holder 38. In other words, the head moving mechanism 18 moves the thermal head 35 in a direction so that the thermal head 35 is approached to the transferred roller 36 and is separated from the transferred roller 36 interlocking with movement of the thermal head 6 which is moved in a direction approaching the platen roller 17 and in a direction separated from the platen roller 17.

Specifically, the head moving mechanism 18 moves the thermal heads 6 and 35 to three positions, i.e., a first position (see FIG. 4) where the thermal head 6 is separated from the platen roller 17 and the thermal head 6 is separated from the transferred roller 36, a second position (see FIG. 5(A)) where the thermal head 35 approaches the platen roller 17 and the thermal head 35 approaches the transferred roller 36, and a third position (see FIG. 5(B)) where the thermal head 6 is separated from the platen roller 17 and the thermal head 35 approaches the transferred roller 36.

When the printing device 1 is in a standby state, the thermal heads 6 and 35 are located at the first position and, in this case, printing on a card 2 and transferring of ink to the transferred roller 36 are unable to be performed. When the thermal heads 6 and 35 are located at the second position, printing on the card 2 and transferring of ink to the transferred roller 36 are capable of being performed and thus, when the thermal head 6 is heated, printing on the card 2 is performed and, when the thermal head 35 is heated, transferring of ink to the transferred roller 36 (specifically, transferring of ink to an outer cover member 50 described below which structures the transferred roller 36) is performed. When the thermal heads 6 and 35 are located at the third position, printing on a card 2 is unable to be performed but transferring of ink to the transferred roller 36 is capable of being performed and thus, when the thermal head 35 is heated, transferring of ink to the transferred roller 36 is performed.

(Structures of Transferred Roller and Peripheral Portion of Transferred Roller)

Figure 7:
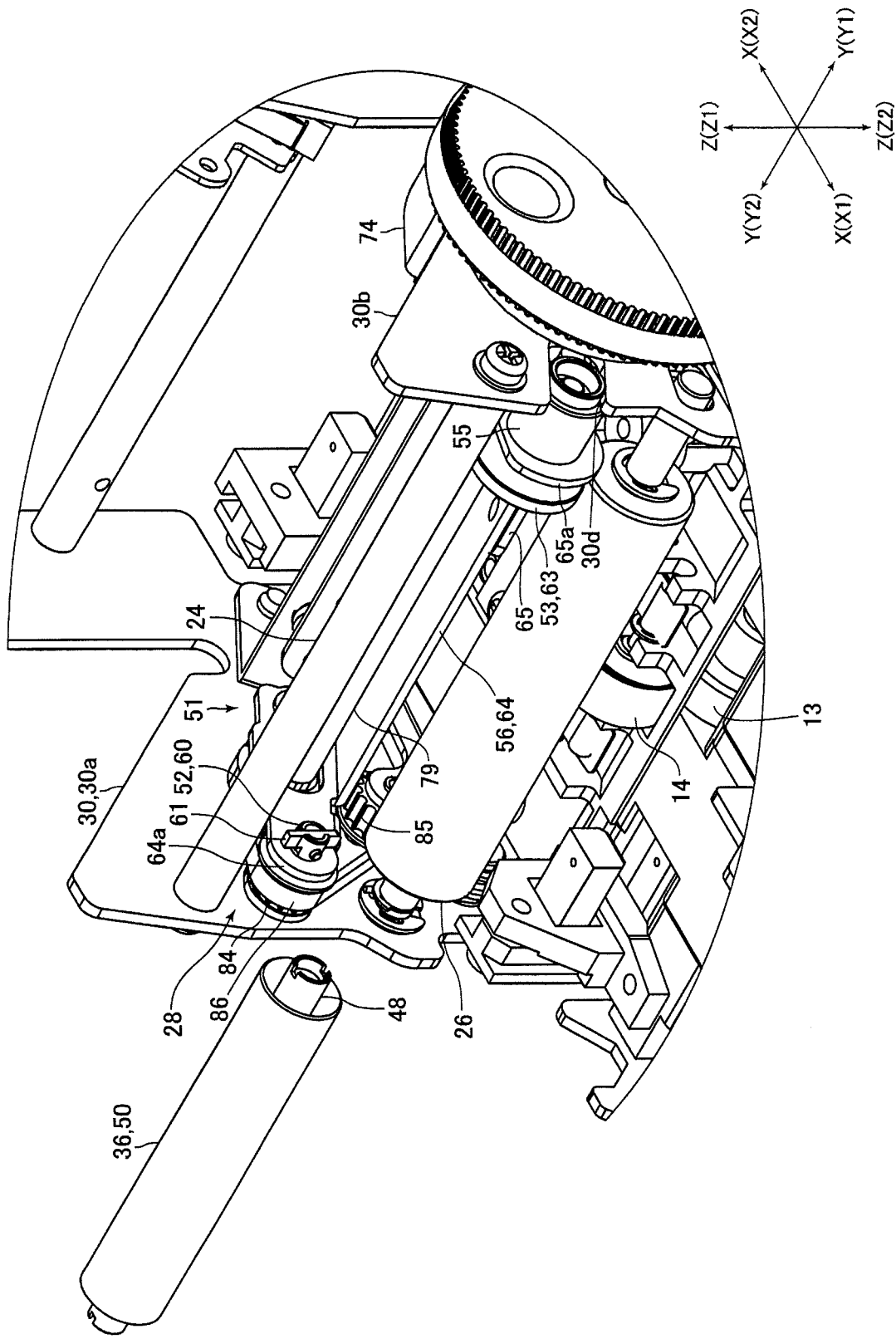
FIG. 7 is an enlarged perspective view showing the "E" part in FIG. 6 in a state that a transferred roller is detached from the state shown in FIG. 6.
Figure 8:
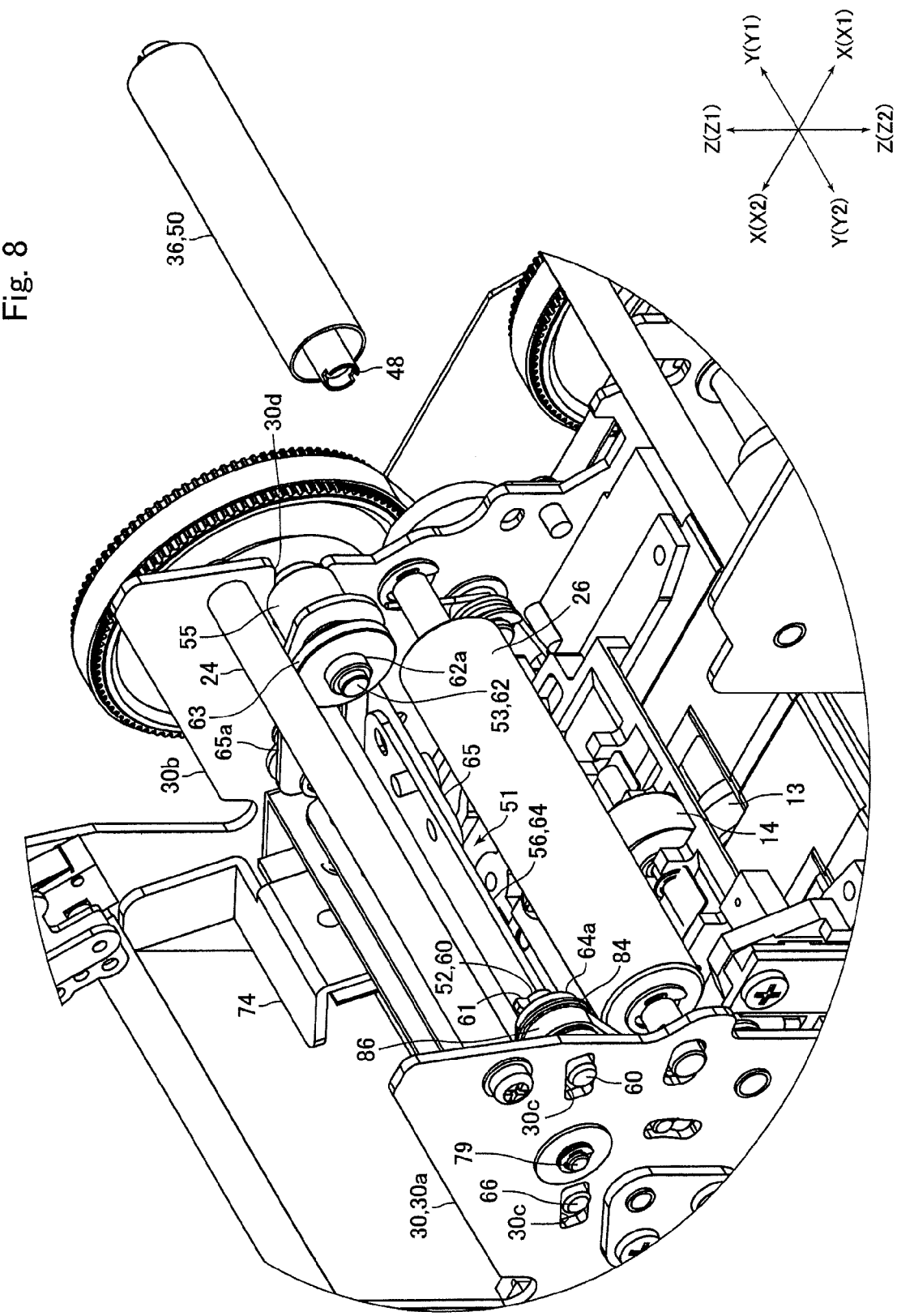
FIG. 8 is an enlarged perspective view showing the "E" part in FIG. 6 viewed in another direction in a state that the transferred roller is detached from the state shown in FIG. 6.
Figure 9:
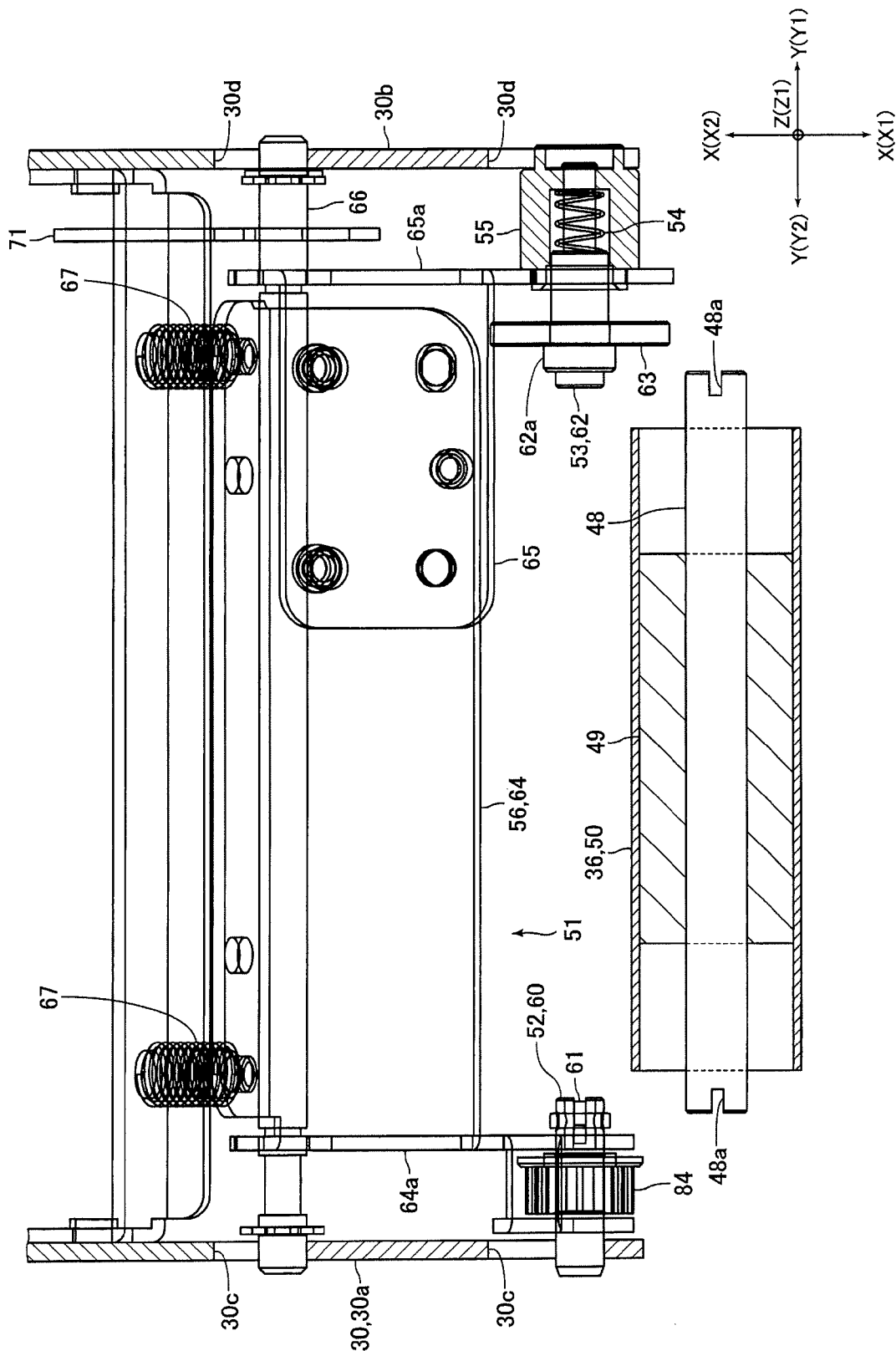
FIG. 9 is an explanatory plan view showing structures of the transferred roller and its peripheral portion shown in FIG. 8.

FIG. 6 is a perspective view showing a state that the first housing 29 and a structure attached to the first housing 29 are detached from the printing device 1 shown in FIG. 1. FIG. 7 is an enlarged perspective view showing the "E" part in FIG. 6 in a state that the transferred roller 36 is detached from the state shown in FIG. 6. FIG. 8 is an enlarged perspective view showing the "E" part in FIG. 6 viewed in another direction in a state that the transferred roller 36 is detached from the state shown in FIG. 6. FIG. 9 is an explanatory plan view showing structures of the transferred roller 36 and its peripheral portion shown in FIG. 8.

The transferred roller 36 is, as shown in FIG. 9, structured of a rotation shaft 48, a cylindrical shaped core member 49 which is fixed to an outer peripheral face of the rotation shaft 48, and an outer cover member 50 which covers an outer peripheral face of the core member 49 and structures an outer peripheral face of the transferred roller 36. The rotation shaft 48 is formed of metal material such as a steel bar. At least both end sides of the rotation shaft 48 are formed in a hollow shape. Further, a key groove 48a is formed at both ends of the rotation shaft 48. The core member 49 is formed of an elastic member having elasticity. Specifically, the core member 49 is formed of rubber such as urethane rubber. A width of the core member 49 (width in its axial direction) is set to be the same or a little wider than a width in the right and left direction (width in the "Y" direction) of the thermal head 35.

The outer cover member 50 is formed of the same material as a card 2. In other words, the outer cover member 50 is formed of polyvinyl chloride. More specifically, the outer cover member 50 is formed of soft polyvinyl chloride. Further, the outer cover member 50 is formed of transparent polyvinyl chloride. A width of the outer cover member 50 (width in the axial direction) is set to be wider than the width of the core member 49. Further, the width of the outer cover member 50 is set to be shorter than a length of the rotation shaft 48 (length in its axial direction) and both end sides of the rotation shaft 48 are protruded with respect to the outer cover member 50. The outer cover member 50 is, for example, a heat shrinkable tube formed in a tube shape and, when heat is applied to the outer cover member 50 in a state that the core member 49 is inserted into an inner peripheral side of the outer cover member 50, the outer cover member 50 is shrunk to be fixed to the core member 49.

The transferred roller 36 is oppositely disposed to the thermal head 35. Specifically, the transferred roller 36 is oppositely disposed to the thermal head 35 from an obliquely rear lower side. The transferred roller 36 is held by a roller holding part 51 so that its axial direction is substantially coincided with the right and left direction. Further, the transferred roller 36 is capable of being attached to and detached from the roller holding part 51.

The roller holding part 51 includes a first engaging part 52 which is engaged with a left end of the rotation shaft 48 to be rotated with the transferred roller 36, a second engaging part 53 which is engaged with a right end of the rotation shaft 48 to be rotated with the transferred roller 36, and a compression coil spring 54 (see FIG. 9) as an engaging part urging member which urges the second engaging part 53 toward the transferred roller 36 (in other words, which urges toward an inner side in the right and left direction). Further, the roller holding part 51 includes a spring holder 55 which holds the compression coil spring 54, and a holder 56 which rotatably holds the first engaging part 52 and holds the spring holder 55.

The first engaging part 52 includes a rotation shaft 60 which is rotatably held by the holder 56 with the right and left direction as its axial direction, and a key 61 which is fixed to a right end side of the rotation shaft 60. An outer peripheral face of the rotation shaft 60 is fixed with a pulley 84 described below which structures a power transmission mechanism 28 of the ribbon feeding mechanism 9. The first engaging part 52 is connected with the ribbon feeding mechanism 9. The key 61 is capable of engaging with the key groove 48a of the rotation shaft 48.

The second engaging part 53 includes a rotation shaft 62 which is held by the spring holder 55 with the right and left direction as its axial direction, and a circular plate-shaped flange 63 which is fixed to an outer peripheral face of the rotation shaft 62. The spring holder 55 is formed in a substantially bottomed cylindrical shape and is fixed to the holder 56 so that its bottom part is disposed on the right side. A right end side portion of the rotation shaft 62 is inserted into an inner peripheral side of the spring holder 55. The rotation shaft 62 is held by an inner peripheral face of the spring holder 55 and a bottom part of the spring holder 55 so as to be rotatable with respect to the spring holder 55 and movable in the right and left direction.

The compression coil spring 54 is disposed on an inner peripheral side of the spring holder 55. Further, a right end side portion of the rotation shaft 62 is passed through an inner peripheral side of the compression coil spring 54. A left end of the compression coil spring 54 is abutted with the rotation shaft 62 and a right end of the compression coil spring 54 is abutted with the bottom part of the spring holder 55 and thus the rotation shaft 62 is urged to the left side by an urging force of the compression coil spring 54. A left end side of the rotation shaft 62 is formed with a circular plate-shaped flange part 62a which is enlarged to an outer side in the radial direction.

The right end side of the rotation shaft 60 is inserted into the inner peripheral face on the left end side of the rotation shaft 48 and the key 61 is engaged with the key groove 48a formed on the left end of the rotation shaft 48. In addition, the left end side of the rotation shaft 62 is inserted into the inner peripheral face on the right end side of the rotation shaft 48 and the flange part 62a of the rotation shaft 62 which is urged by the compression coil spring 54 is abutted with the right end of the rotation shaft 48. In this manner, the transferred roller 36 is held by the roller holding part 51. In other words, the transferred roller 36 is held by the roller holding part 51 through the urging force of the compression coil spring 54. Further, when the rotation shaft 62 is moved to the right side against the urging force of the compression coil spring 54, the transferred roller 36 can be detached from the roller holding part 51.

The holder 56 is held by the second housing 30 so as to be movable toward an obliquely front upper side and toward an obliquely rear lower side. Specifically, the holder 56 is held by the second housing 30 so that the transferred roller 36 is movable in an approaching direction to the thermal head 35 and in a separated direction from the thermal head 35. Further, the holder 56 is disposed between a left side face part 30a and a right side face part 30b of the second housing 30. The holder 56 is formed so that a first holder 64 and a second holder 65 are integrated with each other with a screw or the like not shown.

The first holder 64 is formed with a shaft holding part 64a which rotatably holds the rotation shaft 60. The second holder 65 is formed with a holder fixing part 65a to which the spring holder 55 is fixed. The shaft holding part 64a and the holder fixing part 65a are disposed in a substantially parallel to the "Z-X" plane which is structured by the "Z" direction and the "X" direction. The rotation shaft 60 is held by the shaft holding part 64a so as to protrude to the left side with respect to the shaft holding part 64a in the right and left direction, and the spring holder 55 is fixed to the holder fixing part 65a so as to protrude to the right side with respect to the holder fixing part 65a in the right and left direction. The holder 56 is attached with a guide shaft 66 which is disposed with the right and left direction as its axial direction as shown in FIG. 9. Both end side portions of the guide shaft 66 are protruded to outer sides in the right and left direction with respect to the shaft holding part 64a and the holder fixing part 65a.

The left side face 30a is formed with guide grooves 30c which are engaged with a left end side portion of the rotation shaft 60 and a left end side portion of the guide shaft 66. The right side face 30b is formed with guide grooves 30d which are engaged with a right end side portion of the spring holder 55 and a right end side portion of the guide shaft 66. The holder 56 is movable toward an obliquely front upper side and an obliquely rear lower side by being guided by the rotation shaft 60, the spring holder 55, the guide shaft 66 and the guide grooves 30c and 30d. In other words, the roller holding part 51 is movable toward an obliquely front upper side and toward an obliquely rear lower side by being guided by the guide grooves 30c and 30d. The left side face part 30a and the right side face part 30b in this embodiment are a second roller holding part which movably holds the roller holding part 51 in a direction so that the transferred roller 36 is approached to the thermal head 35 and so that the transferred roller 36 is separated from the thermal head 35.

Further, the holder 56 is urged to an obliquely front upper side by two compression coil springs 67 which are disposed on an obliquely rear lower side of the holder 56. Specifically, the holder 56 is urged by two compression coil springs 67 in a direction that the transferred roller 36 is approached to the thermal head 35. In other words, the transferred roller 36 is urged toward the thermal head 35 together with the roller holding part 51 by the compression coil springs 67. The compression coil spring 67 in this embodiment is a holding part urging member which urges the roller holding part 51 in a direction that the transferred roller 36 approaches the thermal head 35.

(Structure of Detection Mechanism)

Figure 10:
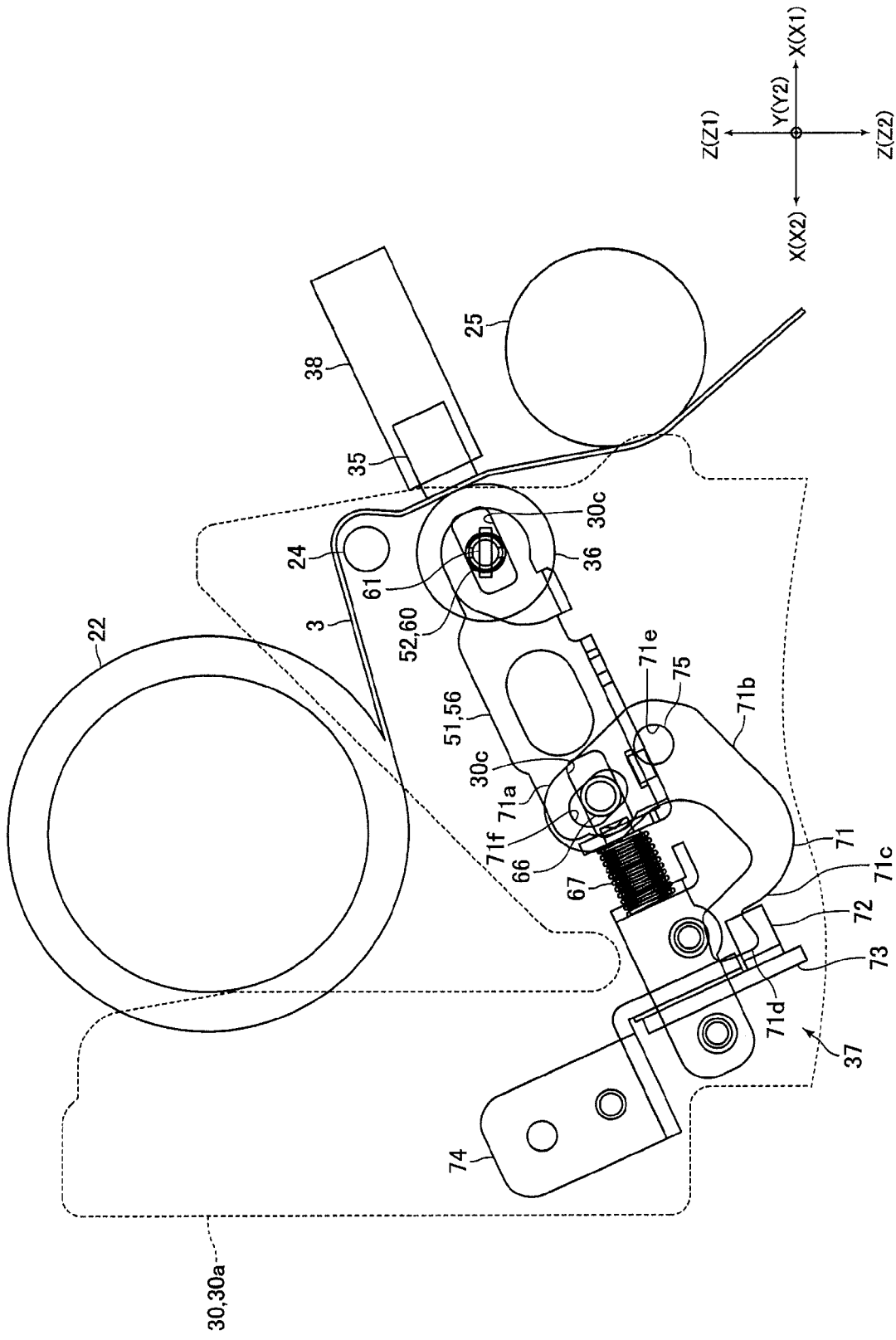
FIG. 10 is an explanatory side view showing a structure and an operation of a detection mechanism in FIG. 1.
Figure 11:
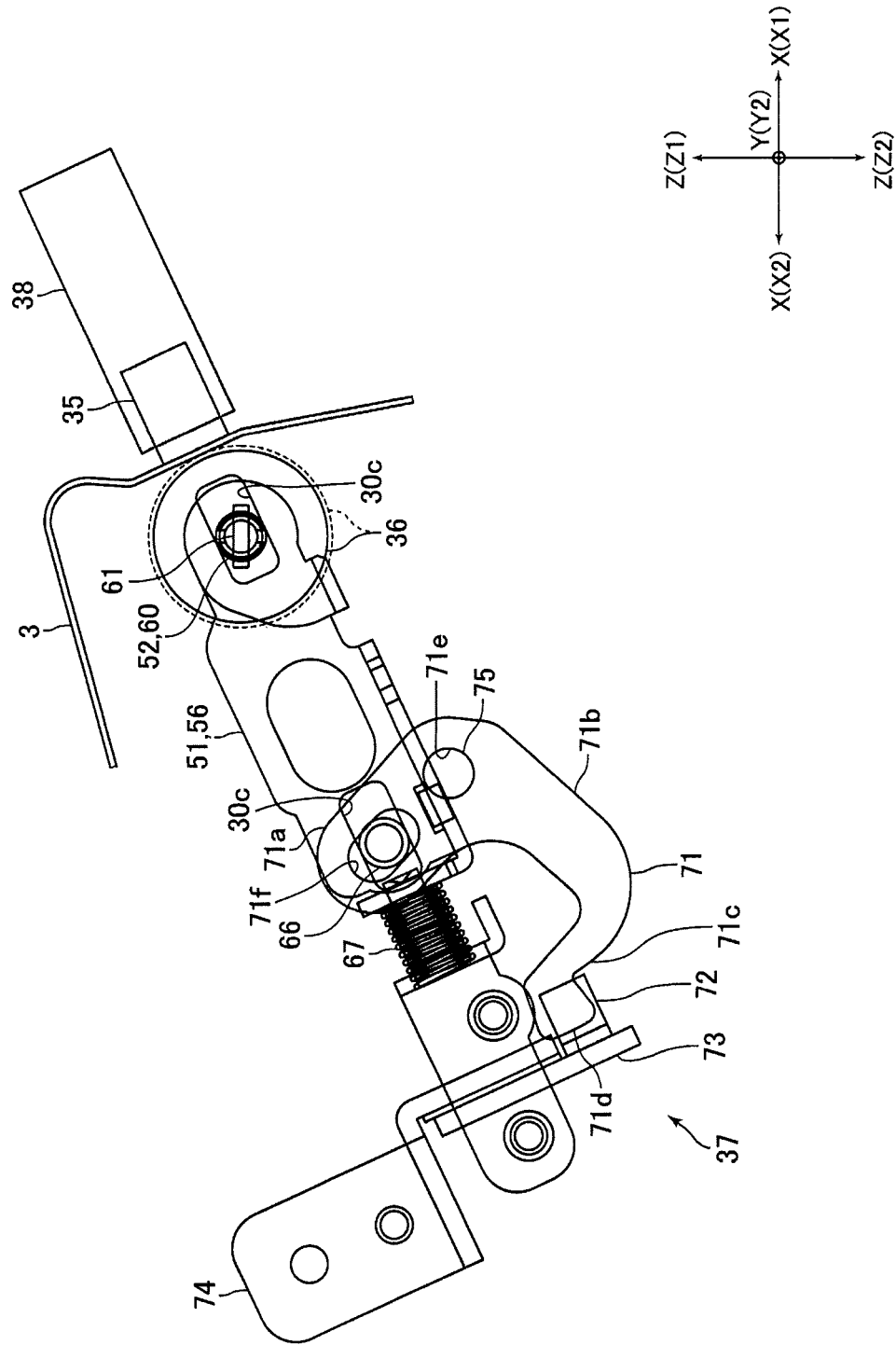
FIG. 11 is an explanatory side view showing the structure and the operation of the detection mechanism in FIG. 1.

FIGS. 10 and 11 are explanatory side views showing a structure and an operation of the detection mechanism 37 shown in FIG. 1.

The detection mechanism 37 includes a lever member 71 which is turned with movement of the roller holding part 51 and a sensor 72 which detects movement of the lever member 71. The sensor 72 is an optical type sensor provided with a light emitting element and a light receiving element (not shown) which are oppositely disposed to each other. The sensor 72 is disposed on an obliquely rear lower side with respect to the roller holding part 51. Further, the sensor 72 is mounted on a board 73. The board 73 is fixed to the right side face part 30b of the second housing 30 through a bracket 74. In accordance with an embodiment of the present invention, the sensor 72 may be a mechanical micro-switch having contact switches or the like.

The lever member 71 is formed in a flat plate shape and is turnably held by a fixed shaft 75 which is fixed to the right side face part 30b. The lever member 71 is, as shown in FIG. 10, structured of a first lever part 71a, a second lever part 71b whose one end side is connected with one end side of the first lever part 71a, a third lever part 71c whose one end side is connected with the other end side of the second lever part 71b, and a fourth lever part 71d whose one end side is connected with the other end side of the third lever part 71c. The first lever part 71a and the second lever part 71b are connected with each other so as to form a substantially right angle, and the second lever part 71b and the third lever part 71c are connected with each other so as to form a substantially right angle, and the third lever part 71c and the fourth lever part 71d are connected with each other so as to form a substantially right angle. The first lever part 71a and the third lever part 71c are extended to the same direction with respect to the second lever part 71b. The second lever part 71b and the fourth lever part 71d are extended in an opposite direction to each other with respect to the third lever part 71c.

A round hole-shaped through-hole 71e with which the fixed shaft 75 is engaged is formed at a boundary of the first lever part 71a and the second lever part 71b. The first lever part 71a is formed with a through-hole 71f in an elongated hole shape with which a right end side portion of the guide shaft 66 is engaged. When the guide shaft 66 is moved toward an obliquely front upper side and toward an obliquely rear lower side (in other words, when the roller holding part 51 is moved toward an obliquely front upper side and toward an obliquely rear lower side), the lever member 71 is turned with the fixed shaft 75 as a turning center. In this embodiment, a portion where the through-hole 71f of the first lever part 71a is formed is a holding part engaging part which is engaged with the roller holding part 51.

The fourth lever part 71d is disposed at a position where a light between a light emitting element and a light receiving element of the sensor 72 can be intercepted. When the lever member 71 is turned with the fixed shaft 75 as a turning center, the fourth lever part 71d is moved between a position, where the fourth lever part 71d is separated from a portion between the light emitting element and the light receiving element of the sensor 72, and a position where the fourth lever part 71d intercepts a light from the light emitting element to the light receiving element of the sensor 72. The fourth lever part 71d in this embodiment is a detected part which is to be detected by the sensor 72. A distance from the center of the fixed shaft 75 to the fourth lever part 71d is set to be longer than a distance from the center of the fixed shaft 75 to a portion in which the through-hole 71f of the first lever part 71a is formed.

As described above, the transferred roller 36 is urged toward the thermal head 35 by the compression coil spring 67 and, when the thermal head 35 is moved to the approaching direction to the transferred roller 36, the transferred roller 36 is abutted with the thermal head 35 through the ink ribbon 3. In this embodiment, in a case that a transferred amount of ink of the ink ribbon 3 to the transferred roller 36 is small and an outer diameter of the transferred roller 36 is smaller than a predetermined size, as shown in FIG. 10, the fourth lever part 71d does not intercept a light from the light emitting element to the light receiving element of the sensor 72.

When ink is transferred to the transferred roller 36, the roller holding part 51 is moved in a direction so as to be separated from the thermal head 35 against the urging force of the compression coil spring 67. In this embodiment, when a transferred amount of ink to the transferred roller 36 is increased and an outer diameter of the transferred roller 36 becomes larger than a predetermined size as shown by the broken line in FIG. 11, the fourth lever part 71d intercepts a light from the light emitting element and the light receiving element of the sensor 72. In other words, in this embodiment, it is detected that the outer diameter of the transferred roller 36 has become larger than the predetermined size by intercepting a light from the light emitting element to the light receiving element of the sensor 72 by the fourth lever part 71d.

(Structure of Ribbon Feeding Mechanism)

Figure 12:
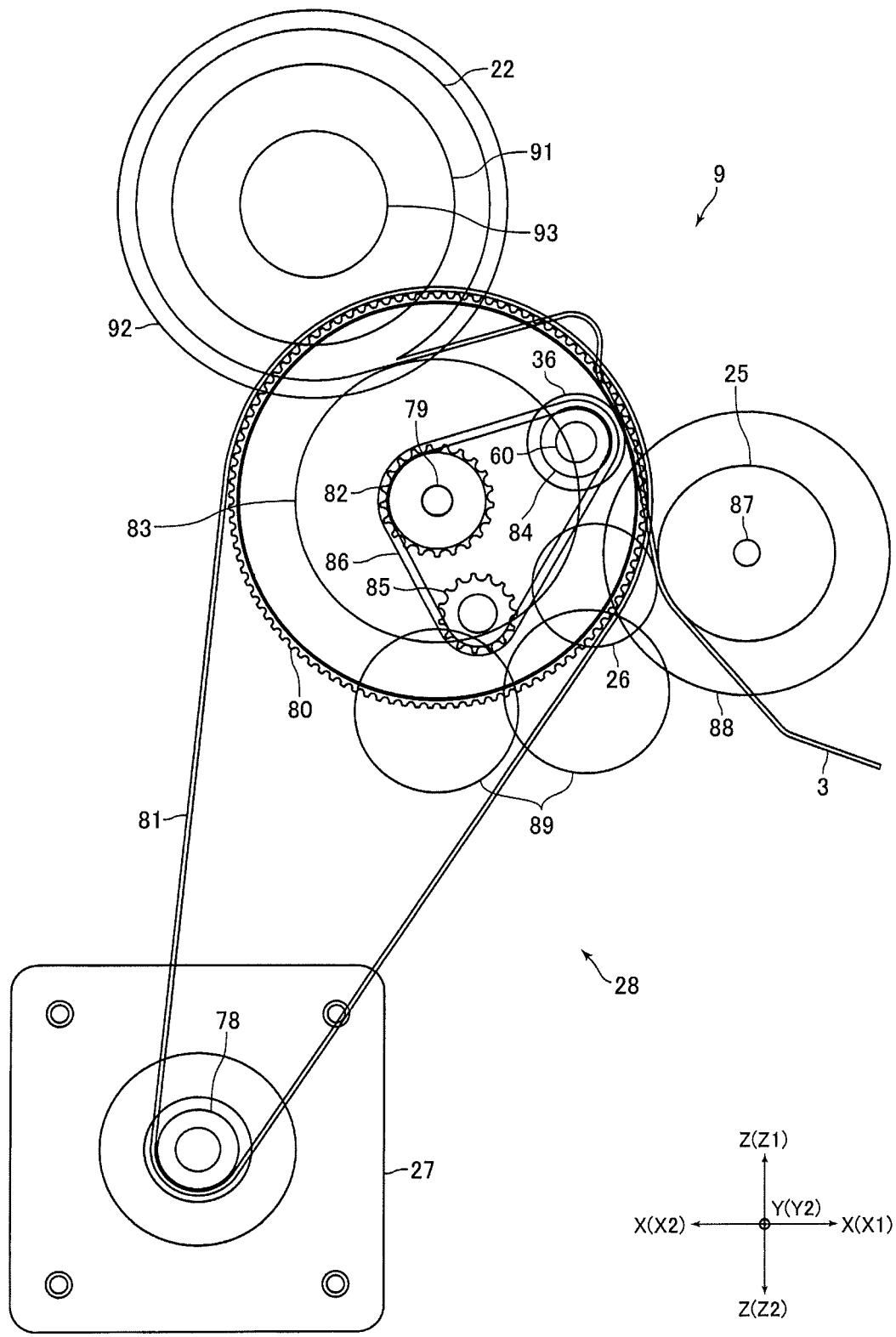
FIG. 12 is an explanatory side view showing a structure of a ribbon feeding mechanism in FIG. 1.

FIG. 12 is an explanatory side view showing a structure of the ribbon feeding mechanism 9 in FIG. 1.

As described above, the ribbon feeding mechanism 9 includes the ribbon feed roller 25, the pad roller 26, the ribbon feed motor 27 and the power transmission mechanism 28. The power transmission mechanism 28 includes a pulley 78 which is fixed to an output shaft of the ribbon feed motor 27, a rotation shaft 79 which is rotatably supported by the left side face part 30a and the right side face part 30b of the second housing 30, and a pulley 80 which is fixed to the rotation shaft 79. A belt 81 is stretched over between the pulley 78 and the pulley 80. The rotation shaft 79 is attached with a pulley 82 and a gear 83 whose pitch diameters are smaller than the pulley 80.

A pulley 84 is fixed to the rotation shaft 60 which structures the roller holding part 51. A belt 86 is stretched over a pulley 85 which is rotatably held by the shaft holding part 64a and the pulleys 82 and 84. The pulley 85 functions to adjust a tension of the belt 86. A gear 88 is fixed to the rotation shaft 87 to which the ribbon feed roller 25 is fixed. The gear 88 is connected with the gear 83 through a gear train 89. A gear 92 is attached to the winding core 91 around which the ink ribbon 3 is wound in the ribbon winding part 22. The gear 92 is engaged with the gear 83 and is connected with the gear 83.

The ribbon feed motor 27 is rotated in one direction. When the ribbon feed motor 27 is rotated in one direction, the winding core 91 is rotated in a direction that the ink ribbon 3 is wound up. In other words, when the ribbon feed motor 27 is rotated in one direction, the winding core 91 is rotated in a clockwise direction (clock direction) in FIG. 12. Further, when the ribbon feed motor 27 is rotated in one direction, the ribbon feed roller 25 and the transferred roller 36 engaged with the rotation shaft 60 are rotated in a feeding direction of the ink ribbon 3 toward the ribbon winding part 22. In other words, when the ribbon feed motor 27 is rotated in one direction, the ribbon feed roller 25 is rotated in the clock direction and the transferred roller 36 is rotated in a counterclockwise direction (counter-clock direction) in FIG. 12.

As described above, the power transmission mechanism 28 functions to transmit the power of the ribbon feed motor 27 to the winding core 91 and the transferred roller 36 in addition to the ribbon feed roller 25. The ribbon feed motor 27 in this embodiment is a drive motor for rotating the winding core 91 and the transferred roller 36.

Further, the power transmission mechanism 28 includes a torque limiter 93 which limits a winding torque for the ink ribbon 3 by the winding core 91. The torque limiter 93 is disposed between the winding core 91 and the gear 92 in a transmission path of the power between the ribbon feed motor 27 and the winding core 91. Further, in this embodiment, a one-way clutch by which the rotation shaft 60 is idled in the counterclockwise direction with respect to the pulley 84 is incorporated in the pulley 84. In other words, the one-way clutch is incorporated in the pulley 84 for idling the transferred roller 36 in the counterclockwise direction with respect to the pulley 84 (the transferred roller 36 is idled in a direction in which the winding core 91 winds up the ink ribbon 3).

In this embodiment, the power transmission mechanism 28 is structured so that a moving speed of the ink ribbon 3 which is wound up by the winding core 91 is faster than a moving speed of the ink ribbon 3 which is fed by the transferred roller 36. Therefore, normally, when the ribbon feed motor 27 is rotated in the one direction, the transferred roller 36 is idled through an operation of the one-way clutch incorporated in the pulley 84 without the power of the ribbon feed motor 27 being transmitted to the transferred roller 36. On the other hand, for example, when the ink ribbon 3 is stuck to the transferred roller 36 to increase a winding torque of the winding core 91 for the ink ribbon 3, the torque limiter 93 is acted to lower a moving speed of the ink ribbon 3 which is wound up by the winding core 91. When the moving speed of the ink ribbon 3 which is wound up by the winding core 91 is decreased, the power of the ribbon feed motor 27 is transmitted to the transferred roller 36 and thus the transferred roller 36 is rotated by the power of the ribbon feed motor 27.

Principal Effects in this Embodiment

As described above, in this embodiment, the transferred roller 36 is capable of being attached to and detached from the roller holding part 51 and thus the transferred roller 36 is capable of being exchanged. Therefore, in this embodiment, when the transferred roller 36 is exchanged before the surface of the transferred roller 36 is stained with ink in such a state that ink of the ink ribbon 3 heated by the thermal head 35 is not transferred, a state is avoided that ink of the ink ribbon 3 heated by the thermal head 35 is not transferred to the transferred roller 36. As a result, according to this embodiment, printed traces of the ink having the same shape as a printing image printed on a card 2 are prevented from being left on the used ink ribbon 3.

Especially, in this embodiment, the detection mechanism 37 for detecting that an outer diameter of the transferred roller 36 has become a predetermined size or more is provided. Therefore, based on a detected result of the detection mechanism 37, the transferred roller 36 can be surely exchanged before the surface of the transferred roller 36 is stained with ink in such a state that ink of the ink ribbon 3 heated by the thermal head 35 is not transferred. Accordingly, in this embodiment, a state that ink of the ink ribbon 3 heated by the thermal head 35 is not transferred to the transferred roller 36 is surely avoided.

Further, in this embodiment, the outer cover member 50 structuring the outer peripheral face of the transferred roller 36 is formed of the same material as a card 2. Generally, ink which is easily transferred to a card 2 is used as the ink for the ink ribbon 3 and thus, in this embodiment, the ink of the ink ribbon 3 heated by the thermal head 35 is easily transferred to the transferred roller 36. Further, in this embodiment, the outer cover member 50 is wound around the core member 49 made of rubber and thus the outer cover member 50 can be pressed on the ink ribbon 3 over an entire region in the right and left direction by utilizing elasticity of the core member 49. Therefore, the entire ink of the ink ribbon 3 heated by the thermal head 35 can be transferred to the transferred roller 36 and, as a result, the printed traces of ink having the same shape as the printing image printed on the card 2 can be effectively prevented from being left in the used ink ribbon 3.

Further, in this embodiment, when the transferred roller 36 is exchanged, a state that ink of the ink ribbon 3 heated by the thermal head 35 is not transferred to the transferred roller 36 is avoided and thus, maintenance of the printing device 1 is easily performed. Especially, in this embodiment, the transferred roller 36 is held by the roller holding part 51 through an urging force of the compression coil spring 54 and, when the rotation shaft 62 is moved to the right side against the urging force of the compression coil spring 54, the transferred roller 36 can be detached from the roller holding part 51. Therefore, the transferred roller 36 can be exchanged relatively easily. Accordingly, maintenance of the printing device 1 is further easily performed.

In this embodiment, the transferred roller 36 includes the outer cover member 50 which covers an outer peripheral face of the core member 49. Therefore, in this embodiment, when the outer cover member 50 to which ink is transferred is exchanged, the transferred roller 36 can be reused. Accordingly, in this embodiment, a running cost of the printing device 1 can be reduced.

In this embodiment, a distance from the fourth lever part 71d detected by the sensor 72 to the center of the fixed shaft 75 is set to be longer than a distance from the portion of the through-hole 71f of the first lever part 71a with which the roller holding part 51 is engaged to the center of the fixed shaft 75. Therefore, even when variation amount of the outer diameter of the transferred roller 36 to which the ink of the ink ribbon 3 is transferred is a little (for example, even when it is about 0.5 mm), the variation of the outer diameter of the transferred roller 36 can be accurately detected by the sensor 72.

In this embodiment, the head moving mechanism 18 moves the thermal heads 6 and 35 to three positions, i.e., the first position where the thermal head 6 is separated from the platen roller 17 and the thermal head 35 is separated from the transferred roller 36, the second position where the thermal head 6 is approached to the platen roller 17 and the thermal head 35 is approached to the transferred roller 36, and the third position where the thermal head 6 is separated from the platen roller 17 and the thermal head 35 is approached to the transferred roller 36. In other words, in this embodiment, when the thermal head 6 is approached to the platen roller 17 to be capable of printing on a card 2, the thermal head 35 is approached to the transferred roller 36 to be capable of transferring ink to the transferred roller 36. Therefore, in this embodiment, the ink ribbon 3 after ink is transferred by the thermal head 6 is surely heated by the thermal head 35 and the ink of the ink ribbon 3 after the ink is transferred by the thermal head 6 is surely transferred to the transferred roller 36.

Further, in this embodiment, the head moving mechanism 18 is capable of moving the thermal heads 6 and 35 to the third position where the thermal head 6 is separated from the platen roller 17 and the thermal head 35 is approached to the transferred roller 36 and thus, even when the card 2 is not printed by the thermal head 6, ink of the ink ribbon 3 can be transferred to the transferred roller 36 by using the thermal head 35.

In this embodiment, the power transmission mechanism 28 is structured so that a moving speed of the ink ribbon 3 which is wound up by the winding core 91 is set to be faster than a moving speed of the ink ribbon 3 which is fed by the transferred roller 36. Therefore, in this embodiment, the ink ribbon 3 is prevented from being loosened between the winding core 91 and the transferred roller 36. Further, in this embodiment, a one-way clutch by which the transferred roller 36 is idled in a direction that the winding core 91 winds up the ink ribbon 3 is incorporated into the pulley 84. Therefore, even when a moving speed of the ink ribbon 3 which is wound up by the winding core 91 is faster than a moving speed of the ink ribbon 3 which is fed by the transferred roller 36, a load to the ribbon feed motor 27 can be reduced.

In this embodiment, the power transmission mechanism 28 includes the torque limiter 93 which limits a winding torque for the ink ribbon 3 by the winding core 91. Therefore, in this embodiment, for example, even when the ink ribbon 3 is stuck to the transferred roller 36 to cause the winding torque for the ink ribbon 3 by the winding core 91 to be larger, the ink ribbon 3 can be prevented from being broken between the winding core 91 and the transferred roller 36. Further, in this embodiment, when the torque limiter 93 is acted and a moving speed of the ink ribbon 3 which is wound up by the winding core 91 becomes lower, the power of the ribbon feed motor 27 is transmitted to the transferred roller 36 and the transferred roller 36 feeds the ink ribbon 3 toward the winding core 91 and thus, even when the ink ribbon 3 is stuck to the transferred roller 36, sticking of the ink ribbon 3 to the transferred roller 36 can be eliminated.

Other Embodiments

Although the present invention has been shown and described with reference to a specific embodiment, various changes and modifications will be apparent to those skilled in the art from the teachings herein.

In the embodiment described above, the transferred roller 36 is structured of the rotation shaft 48, the core member 49 and the outer cover member 50. However, the present invention is not limited to this embodiment. For example, the transferred roller 36 may be structured of the rotation shaft 48 and the core member 49. In this case, it is preferable that the core member 49 is formed of the same material as a card 2 (in other words, polyvinyl chloride). Further, in the embodiment described above, the outer cover member 50 is formed of the same material as a card 2. However, when ink of the ink ribbon 3 can be transferred, the outer cover member 50 may be formed of material which is different from a card 2.

In the embodiment described above, the card 2 is a card made of polyvinyl chloride whose thickness is about 0.7-0.8 mm. However, the card 2 may be a PET (polyethylene terephthalate) card whose thickness is about 0.18-0.36 mm or may be a paper card having a predetermined thickness. In this case, for example, it is preferable that the outer cover member 50 is formed of the same material as a card 2. Further, in the embodiment described above, a printing medium printed in the printing device 1 is a card 2. However, a printing medium which is printed in the printing device 1 may be a medium such as a printing paper other than a card 2.

In the embodiment described above, the head moving mechanism 18 moves the thermal heads 6 and 35 to three positions, i.e., the first position, the second position and the third position. However, the present invention is not limited to this embodiment. For example, the head moving mechanism 18 moves the thermal heads 6 and 35 to two positions, i.e., the first position and the second position. Further, in the embodiment described above, the head moving mechanism 18 moves the thermal head 35 but a structure for moving the thermal head 35 may be provided separately.

In the embodiment described above, the second engaging part 53 is urged toward the transferred roller 36 by the compression coil spring 54. However, the present invention is not limited to this embodiment. For example, the second engaging part 53 may be urged toward the transferred roller 36 by another spring member such as a plate spring or an elastic member such as rubber. Further, in the embodiment described above, the holder 56 is urged in a direction that the transferred roller 36 is approached to the thermal head 35 by the compression coil spring 67. However, the holder 56 may be urged in a direction that the transferred roller 36 is approached to the thermal head 35 by another spring member such as a plate spring or an elastic member such as rubber.

The invention claimed is:

1. A printing device for use with a printing medium, the printing device comprising:
   a medium conveying passage along which the printing medium is conveyed;
   a printing thermal head structured to heat an ink ribbon to transfer and print ink applied to the ink ribbon on the printing medium;
   a ribbon supplying part configured to supply the ink ribbon to the printing thermal head;
   a ribbon winding part configured to wind up the ink ribbon which is supplied to the printing thermal head;
   an erasing thermal head which is disposed between the printing thermal head and the ribbon winding part in a feed direction of the ink ribbon, the erasing thermal head heating the ink ribbon after ink is transferred by the printing thermal head;
   a transferred roller which is oppositely disposed to the erasing thermal head and is transferred with ink of the ink ribbon heated by the erasing thermal head;
   a roller holding part which holds the transferred roller; and
   a detection mechanism for detecting that an outer diameter of the transferred roller whose outer diameter becomes larger by being transferred with the ink of the ink ribbon has become a predetermined size or more;
   wherein the transferred roller is capable of being attached to and detached from the roller holding part.

2. The printing device according to claim 1, wherein
the roller holding part comprises:
   a first engaging part which is engaged with one end in an axial direction of the transferred roller and is rotated together with the transferred roller;
   a second engaging part which is engaged with the other end in the axial direction of the transferred roller and is rotated together with the transferred roller and is movable in the axial direction of the transferred roller; and
   an engaging part urging member which urges the second engaging part toward the transferred roller;
   the transferred roller is held by the roller holding part through an urging force of the engaging part urging member; and
   when the second engaging part is moved against the urging force of the engaging part urging member, the transferred roller is capable of being detached from the roller holding part.

3. The printing device according to claim 1, further comprising:
   a second roller holding part which movably holds the roller holding part in a direction that the transferred roller is approached to the erasing thermal head and in a direction that the transferred roller is separated from the erasing thermal head; and
   a holding part urging member which urges the roller holding part in the direction that the transferred roller is approached to the erasing thermal head;
   wherein the detection mechanism comprises a lever member, which is turned with movement of the roller holding part, and a sensor which detects movement of the lever member.

4. The printing device according to claim 3, wherein
the second roller holding part comprises a fixed shaft which turnably holds the lever member,
the lever member comprises a holding part engaging part which is engaged with the roller holding part and a detected part which is detected by the sensor, and
a distance from the fixed shaft which is a turning center of the lever member to the detected part is longer than a distance from the fixed shaft to the holding part engaging part.

5. A printing device for use with a printing medium, the printing device comprising:
   a medium conveying passage along which the printing medium is conveyed;
   a printing thermal head structured to heat an ink ribbon to transfer and print ink applied to the ink ribbon on the printing medium;

a ribbon supplying part configured to supply the ink ribbon to the printing thermal head;

a ribbon winding part configured to wind up the ink ribbon which is supplied to the printing thermal head;

an erasing thermal head which is disposed between the printing thermal head and the ribbon winding part in a feed direction of the ink ribbon, the erasing thermal head heating the ink ribbon after ink is transferred by the printing thermal head;

a transferred roller which is oppositely disposed to the erasing thermal head and is transferred with ink of the ink ribbon heated by the erasing thermal head; and wherein at least an outer peripheral face of the transferred roller is formed of the same material as material forming a printed surface of the printing medium.

6. The printing device according to claim 5, wherein the transferred roller comprises:

a core member made of rubber; and an outer cover member in a tube shape which is formed of the same material as the printed surface of the printing medium, the outer cover member covering an outer peripheral face of the core member.

7. A printing device for use with a printing medium, the printing device comprising:

a medium conveying passage along which the printing medium is conveyed;

a printing thermal head structured to heat an ink ribbon to transfer and print ink applied to the ink ribbon on the printing medium;

a ribbon supplying part configured to supply the ink ribbon to the printing thermal head;

a ribbon winding part configured to wind up the ink ribbon which is supplied to the printing thermal head;

an erasing thermal head which is disposed between the printing thermal head and the ribbon winding part in a feed direction of the ink ribbon, the erasing thermal head heating the ink ribbon after ink is transferred by the printing thermal head;

a transferred roller which is oppositely disposed to the erasing thermal head and is transferred with ink of the ink ribbon heated by the erasing thermal head;

a roller holding part which holds the transferred roller;

a facing member which is oppositely disposed to the printing thermal head; and a head moving mechanism which moves the printing thermal head in a direction that the printing thermal head is approached to the facing member and in a direction that the printing thermal head is separated from the facing member;

wherein the transferred roller is capable of being attached to and detached from the roller holding part; and wherein the head moving mechanism moves the erasing thermal head interlocking with movement of the printing thermal head in a direction that the erasing thermal head is approached to the transferred roller and in a direction that the erasing thermal head is separated from the transferred roller.

8. The printing device according to claim 7, wherein the head moving mechanism moves the printing thermal head and the erasing thermal head to following three positions:

a first position where the printing thermal head is separated from the facing member and the erasing thermal head is separated from the transferred roller;

a second position where the printing thermal head is approached to the facing member and the erasing thermal head is approached to the transferred roller; and a third position where the printing thermal head is separated from the facing member and the erasing thermal head is approached to the transferred roller.

9. A printing device for use with a printing medium, the printing device comprising:

a medium conveying passage along which the printing medium is conveyed;

a printing thermal head structured to heat an ink ribbon to transfer and print ink applied to the ink ribbon on the printing medium;

a ribbon supplying part configured to supply the ink ribbon to the printing thermal head;

a ribbon winding part configured to wind up the ink ribbon which is supplied to the printing thermal head;

an erasing thermal head which is disposed between the printing thermal head and the ribbon winding part in a feed direction of the ink ribbon, the erasing thermal head heating the ink ribbon after ink is transferred by the printing thermal head;

a transferred roller which is oppositely disposed to the erasing thermal head and is transferred with ink of the ink ribbon heated by the erasing thermal head;

a roller holding part which holds the transferred roller;

a drive motor for rotating a winding core of the ribbon winding part and the transferred roller, and a power transmission mechanism for transmitting power of the drive motor to the winding core and the transferred roller, wherein the transferred roller is capable of being attached to and detached from the roller holding part;

wherein a moving speed of the ink ribbon which is wound up by the winding core is set to be faster than a moving speed of the ink ribbon which is fed by the transferred roller, and wherein the power transmission mechanism comprises a torque limiter which limits a winding torque for the ink ribbon by the winding core, and a one-way clutch by which the transferred roller is idled in a direction that the winding core winds up the ink ribbon.

10. The printing device according to claim 5, wherein the outer peripheral face of the transferred roller is formed of polyvinyl chloride.

\* \* \* \* \*